(12) United States Patent
Woo et al.

(10) Patent No.: US 6,887,555 B2
(45) Date of Patent: May 3, 2005

(54) FLOOR COVERING BASED ON PERFORATED PVC SHEET

(75) Inventors: Je-Suk Woo, Doosan Apartment 101-2303, 151-1, Wonmi-dong, Wonmi-ku, Bucheon-city, Kyungki-do (KR); Hyeong-Keor Yoo, Bucheon (KR)

(73) Assignees: Woojin Corporation, Bucheon (KR); Je-suk Woo, Bucheon (KR)

( * ) Notice: Subject to any disclaimer, the term of this patent is extended or adjusted under 35 U.S.C. 154(b) by 0 days.

(21) Appl. No.: 10/080,456

(22) Filed: Feb. 22, 2002

(65) Prior Publication Data

US 2003/0161994 A1 Aug. 28, 2003

(51) Int. Cl.[7] .............................. B32B 3/14; B32B 3/00; B32B 3/16
(52) U.S. Cl. ..................... 428/138; 15/215; 52/660; 52/661; 428/47; 428/48; 428/49; 428/316.6; 428/318.4
(58) Field of Search ........................ 428/314.2, 315.5, 428/315.9, 316.6, 318.4

(56) References Cited

U.S. PATENT DOCUMENTS

| | | | | |
|---|---|---|---|---|
| 4,415,946 A | * | 11/1983 | Pitts | 361/212 |
| 4,573,299 A | * | 3/1986 | Meroni | 52/513 |
| 6,291,552 B1 | * | 9/2001 | Dong | 523/217 |

FOREIGN PATENT DOCUMENTS

KR   1998-047176   9/1998

\* cited by examiner

*Primary Examiner*—Harold Pyon
*Assistant Examiner*—Petricia L. Nordmeyer
(74) *Attorney, Agent, or Firm*—Michael J. Striker

(57) ABSTRACT

Disclosed is a floor covering, in which a surface material such as wood, Korean paper, textile fabric, and thermosetting resin sheet is attached to a surface of a perforated high density PVC sheet. Shrinkage or expansion differences between the surface material and the PVC sheet are removed because multiple holes of the perforated high density PVC sheet offset shrinkage or expansion of the PVC sheet, thereby cracks or curling of the floor covering are prevented and the floor covering can have a smooth appearance.

2 Claims, 5 Drawing Sheets

FLOOR COVERING BASED ON PERFORATED PVC SHEET

BACKGROUND OF THE INVENTION

1. Field of the Invention

The present invention relates, in general, to a floor covering based on perforated PVC (polyvinyl chloride) sheet, and in particular, to a floor covering based on perforated PVC sheet, in which a surface material such as wood or Korean paper is attached to a upper side of a high density perforated PVC sheet.

2. Description of the Prior Art

A demand for a PVC floor covering, in which a wood surface layer is attached to a PVC sheet, has been growing as high quality architectural interior finish having appearance and feel of wood. However, the PVC floor covering has disadvantages in that the PVC sheet has a different thermal expansion coefficient from the wood layer, and so a surface of the floor covering is not smoothly maintained owing to cracks or curling of the surface.

To avoid the above disadvantages, Korean Laid-open Publication No. 1998-047176 discloses a grained timber PVC floor covering, in which a back sheet is attached to a lower side of a high density PVC sheet, or non-woven fabric is inserted between a grained timber and the PVC sheet, and joined. However, this conventional invention has disadvantages in that an effect of preventing cracks or curling of the surface is not sufficient because the grained timber PVC floor covering does not sufficiently offset shrinkage or expansion differences between the grained timber and the PVC sheet due to use of a back sheet or non-woven layer, and that cracks or curling of the surface are not prevented because shrinkage or expansion differences between the grained timber and the PVC sheet are not offset in the PVC sheet.

SUMMARY OF THE INVENTION

Therefore, it is an object of the present invention to provide a floor covering based on perforated PVC sheet, which can maintain a smooth surface without cracks or curling of the surface.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
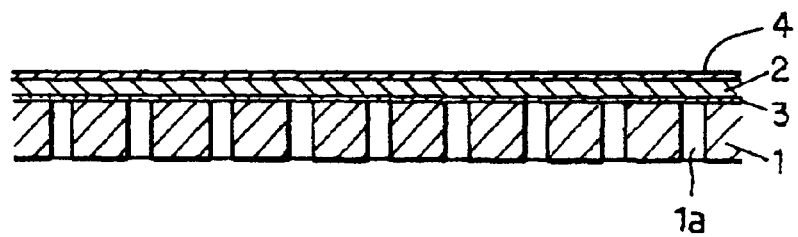
FIG. 1 schematically illustrates a cross sectional view of a floor covering according to the present invention.

Referring to FIG. 1, a cross sectional view of the floor covering according to the present invention is illustrated, wherein a surface material 2 with a UV coating layer, such as wood or Korean paper is attached to a upper side of a perforated high density PVC sheet 1 by an adhesive layer 3. A Korean paper is a paper manufactured using a bark of Broussonetia Kazinoki according to a Korean traditional method.

An example of the surface material 2 further includes textile fabric, fiber reinforced plastics (FRP), and thermosetting resin sheet.

The perforated high density PVC sheet 1 has multiple holes 1a formed on a surface thereof, as shown in FIGS. 1 to 4. The high density PVC sheet of the present invention is highly densified to a specific gravity of 2.0 g/cm$^2$ or more by adding a filler such as barium sulfate (BaSO$_4$) In conjunction with an excess of calcium carbonate to the PVC sheet, unlike a conventional PVC sheet.

The hole 1a may form any shape such as a circle, a quadrangle, a lozenge, and a triangle.

Figure 2:
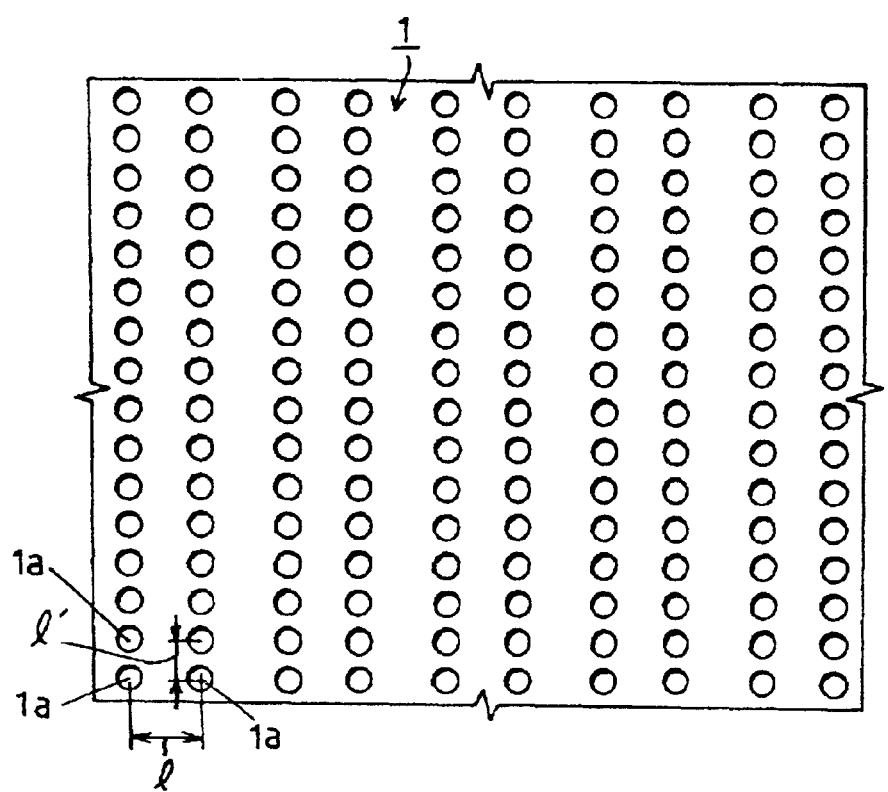
FIG. 2 schematically illustrates a top view of a high density perforated PVC sheet according to the present invention.
Figure 3A:
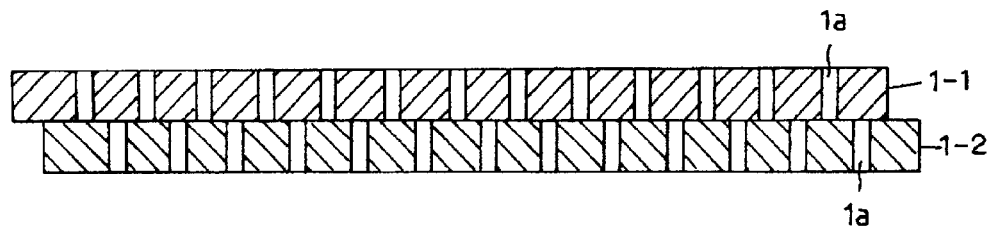
FIGS. 3a to 3d schematically illustrate cross sectional views of various layered structures of the high density perforated PVC sheets according to the present invention.
Figure 3B:
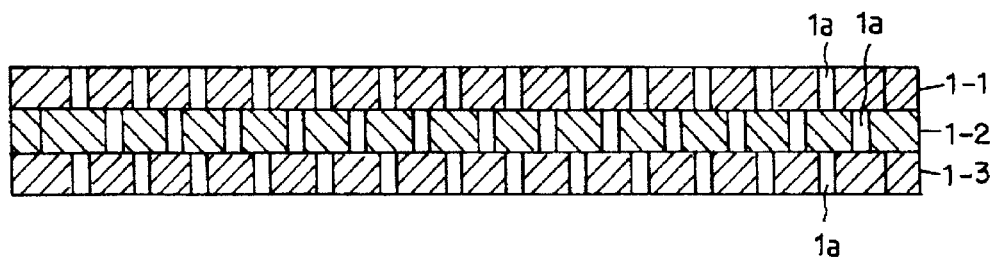
Figure 3C:
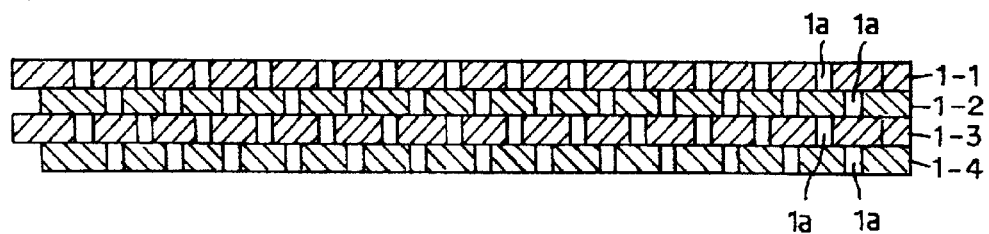
Figure 3D:
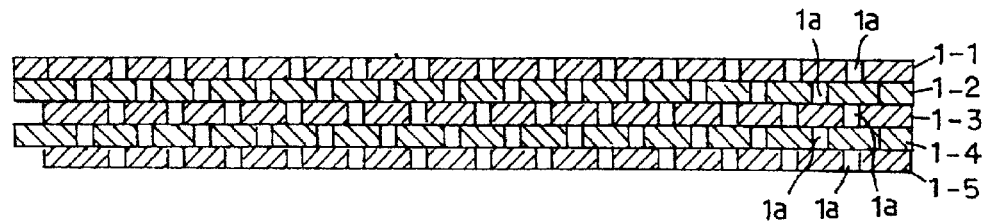
Figure 4A:
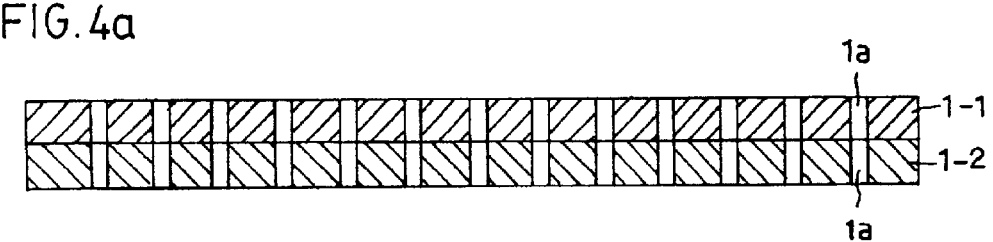
FIGS. 4a to 4d schematically illustrates cross sectional views of other layered structures of the high density perforated PVC sheets according to the present invention.
Figure 4B:
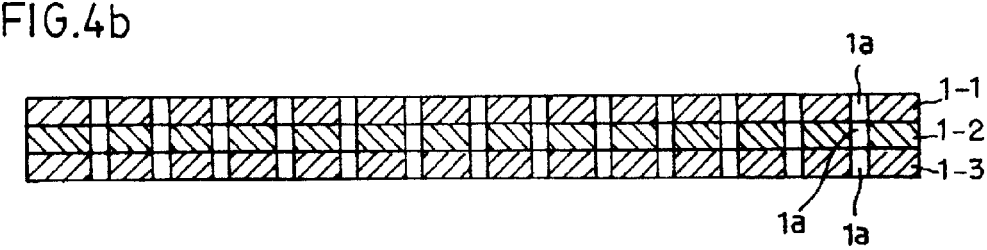
Figure 4C:
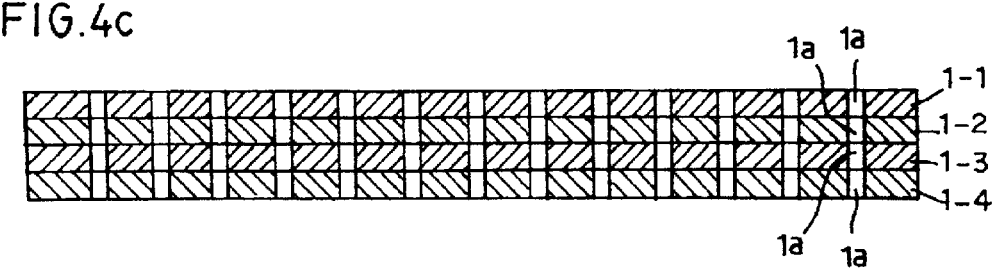
Figure 4D:
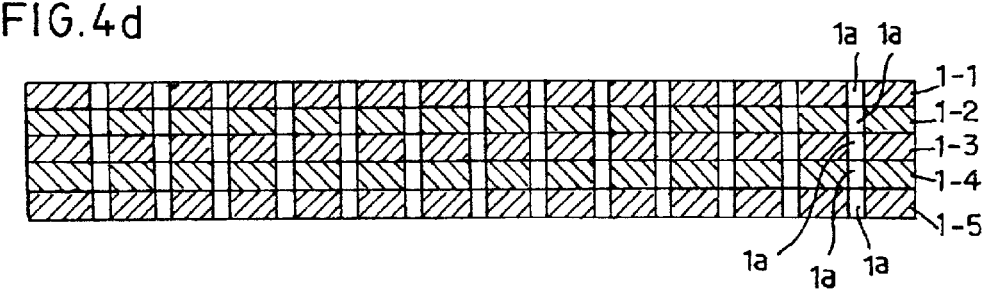

With reference to FIG. 2, holes may be arranged in such a way that two columns of holes 1a with a width interval l and a length interval l' are arranged at regular interval, or holes may be arranged in such a way that the width and length intervals are same as each other, but which is not to be construed to limit the present invention.

Turning now to FIGS. 3a to 3d, various layered structures of the perforted high density PVC sheets according to the present invention are illustrated, wherein the perforated high density PVC sheets 1-1 to 1-5 are joined with heat in such a way that holes 1a of each PVC sheet are not aligned with holes of adjoining other PVC sheets.

FIGS. 3a to 3d illustrate two perforated PVC sheets 1-1 and 1-2 joined with heat, three sheets 1-1, 1-2, and 1-3, four sheets 1-1, 1-2, 1-3, and 1-4, and five sheets 1-1, 1-2, 1-3, 1-4, and 1-5, respectively. Maximally, twenty perforated PVC sheets joined with heat can be used in the present invention.

Referring to FIGS. 4a to 4d, other layered structures of the high perforated high density PVC sheets according to the present invention are illustrated, wherein the high density perforated PVC sheets are joined with heat in such a way that holes 1a of each PVC sheet communicate with holes of adjoining other PVC sheets. FIGS. 4a to 4d illustrate two perforated PVC sheets 1-1 and 1-2 joined with heat, three sheets 1-1, 1-2, and 1-3, four sheets 1-1, 1-2, 1-3, and 1-4, five sheets 1-1, 1-2, 1-3, 1-4, and 1-5, respectively. Maximally, twenty perforated high density PVC sheets joined with heat can be used in the present invention.

Figure 5A:
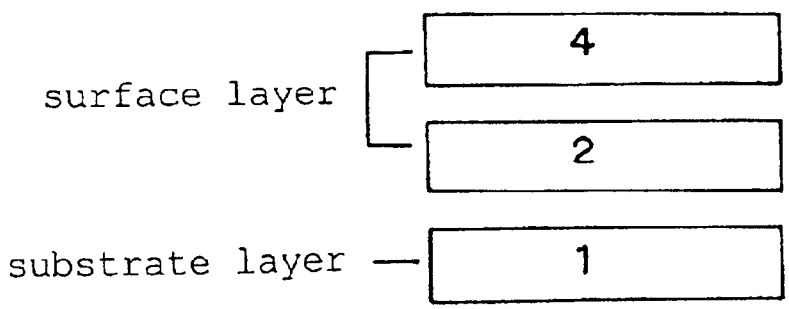
FIGS. 5a to 5d schematically illustrates various layered structures of the floor coverings according to the present invention.
Figure 5B:
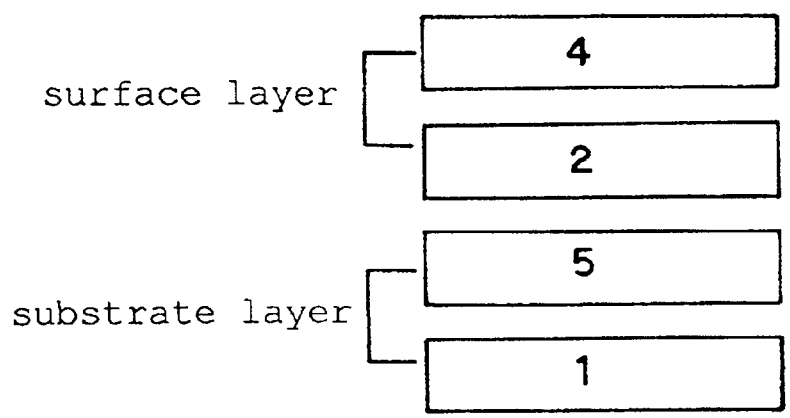
Figure 5C:
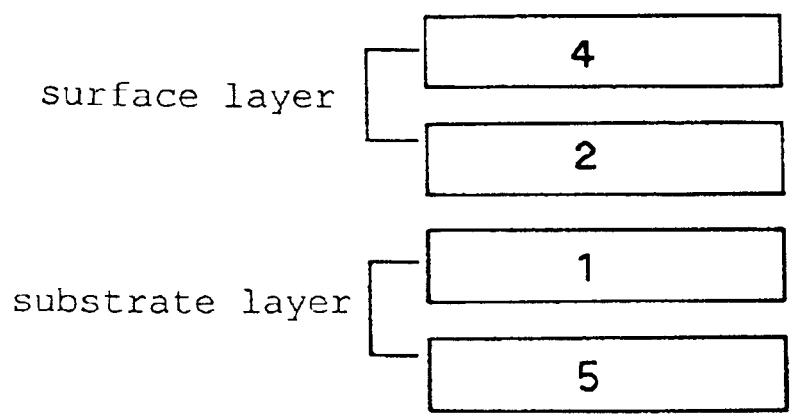
Figure 5D:
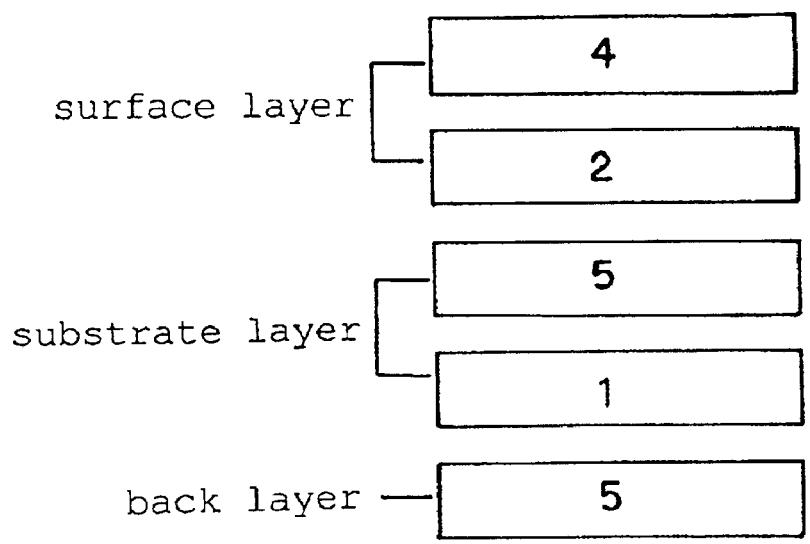

With reference to FIGS. 5a to 5d, various layered structures of the floor coverings according to the present invention are illustrated, wherein the layered structure comprises a surface layer, a substrate layer, and a back layer. In FIGS. 5a to 5c, a wood thin board 2 with a UV coating layer 4 is used as the surface layer. As for the substrate layer, a perforated high density PVC sheet 1 whose upper side is attached to a glass fiber sheet 5, and a perforated high density PVC sheet 1 whose lower side is attached to a glass fiber sheet 5 are used in FIGS. 5a to 5c, respectively. In FIG. 5d, the wood thin film 2 with the UV coating layer 4 is used as the surface layer a perforated high density PVC sheet 1 whose upper side is attached to a glass fiber sheet 5 is used as the substrate layer, and a perforated high density perforated PVC sheet 1 whose lower side is attached to a glass fiber sheet 5 is used as the back layer.

As described above, the present invention has advantages in that the floor covering removes shrinkage and expansion differences between the PVC sheet and the surface material because multiple holes 1a of the perforated high density PVC sheet 1 offset shrinkage or expansion of the PVC sheet owing to temperature changes, thereby the floor covering of the present invention can be used for a long time under conditions of changing temperature without cracks, bubbling, and curling of the surface of the floor covering.

Another advantage of the floor covering according to the present invention is that the floor covering is excellent in vibration absorptivity, adiabatic property, sound insulating property, and elastic property because of multiple holes 1a of the PVC sheet. The floor covering of the present invention can be used as a shape of tiles or rectangular wood plates by cutting the floor covering in a proper size, and can be used as an inner wall material of a structure as well as the floor covering such as a hypocaust underlay and a wooden floor underlay.

It will thus been that the objects set forth above, among those made apparent from the preceding description, are efficiently attained and, since certain changes may be made in carrying out the above method and in the construction set forth without departing from the spirit and scope of the invention, it is intended that all matter contained in the accompanying drawings shall be interpreted as illustrative and not in a limiting sense.

What is claimed is:

1. A floor covering based on a perforated polyvinyl chloride sheet, comprising: an integrated sheet body prepared by laminating and fusing 2 to 20 perforated high density polyvinyl chloride sheets, each sheet having a plurality of holes; a glass fiber sheet attached to either the upper or lower side of the integrated sheet body; and a wood thin film, having a UV coated layer, attached to the uppermost side of the integrated sheet body.

2. The floor covering according to claim 1, wherein a another glass fiber sheet is attached to the opposite side of the integrated sheet body from which the first-mentioned glass fiber sheet is not attached.

* * * * *